United States Patent
Lee

(10) Patent No.: US 8,528,883 B2
(45) Date of Patent: Sep. 10, 2013

(54) HOLLOW FIBER MEMBRANE FOR HUMIDIFIER AND METHOD FOR MANUFACTURING THE SAME

(75) Inventor: Moo-Seok Lee, Seoul (KR)

(73) Assignee: Kolon Industries, Inc., Kwacheon-si (KR)

( * ) Notice: Subject to any disclaimer, the term of this patent is extended or adjusted under 35 U.S.C. 154(b) by 390 days.

(21) Appl. No.: 12/669,388

(22) PCT Filed: Jul. 29, 2008

(86) PCT No.: PCT/KR2008/004422
§ 371 (c)(1),
(2), (4) Date: Jan. 15, 2010

(87) PCT Pub. No.: WO2009/017356
PCT Pub. Date: Feb. 5, 2009

(65) Prior Publication Data
US 2010/0190093 A1    Jul. 29, 2010

(30) Foreign Application Priority Data
Aug. 1, 2007  (KR) .................. 10-2007-0077294

(51) Int. Cl.
   *B01F 3/04*   (2006.01)
(52) U.S. Cl.
   USPC .......................................... 261/102; 261/104
(58) Field of Classification Search
   USPC ............................... 261/101, 102, 104
   See application file for complete search history.

(56) References Cited

U.S. PATENT DOCUMENTS

| | | | |
|---|---|---|---|
| 3,735,559 A * | 5/1973 | Salemme | 95/52 |
| 5,641,450 A | 6/1997 | Kobayashi et al. | |
| 7,040,606 B2 * | 5/2006 | Okada | 261/23.1 |
| 2007/0246847 A1 * | 10/2007 | Bitoh | 261/104 |
| 2008/0179765 A1 * | 7/2008 | Van Der Net | 261/101 |
| 2009/0121366 A1 * | 5/2009 | Leister et al. | 261/101 |
| 2009/0130495 A1 * | 5/2009 | Terasaki et al. | 429/12 |

FOREIGN PATENT DOCUMENTS

| | | |
|---|---|---|
| CN | 1108583 A | 9/1995 |
| JP | 8-24602 A | 1/1996 |
| JP | 11-76778 A | 3/1999 |
| JP | 2004-290751 A | 10/2004 |
| JP | 2007-59090 A | 3/2007 |
| KR | 10-0638322 B1 | 10/2006 |

* cited by examiner

*Primary Examiner* — Charles Bushey
(74) *Attorney, Agent, or Firm* — Birch, Stewart, Kolasch & Birch, LLP

(57) ABSTRACT

Disclosed are a hollow fiber membrane for a humidifier which exhibits superior moisture/heat-resistance and excellent hydrophilicity and can be manufactured at low cost, and a method for manufacturing the same. The hollow fiber membrane includes a tube-type first hydrophilic polymer film having a hollow center, and a second hydrophilic polymer film coated on the inner surface of the tube-type first hydrophilic polymer film. The method includes producing an intermediate hollow fiber membrane from a first hydrophilic polymer material, potting the intermediate hollow fiber membrane in a housing to produce an intermediate hollow fiber membrane module, and coating a second hydrophilic polymer film on the inner surface of the intermediate hollow fiber membrane.

4 Claims, 2 Drawing Sheets

HOLLOW FIBER MEMBRANE FOR HUMIDIFIER AND METHOD FOR MANUFACTURING THE SAME

TECHNICAL FIELD

The present invention relates to a hollow fiber membrane for humidifiers useful for fuel cells and a method for manufacturing the same. More particularly, the present invention relates to a hollow fiber membrane for humidifiers which exhibits superior moisture/heat-resistance and excellent hydrophilicity and can be manufactured at low cost, and a method for manufacturing the same.

BACKGROUND ART

A fuel cell is defined as an electricity-generating cell that generates electricity through combination of hydrogen and oxygen. Unlike general cells such as dry cells, storage cells and the like, fuel cells have advantages in that they can keep generating electricity for as long as hydrogen and oxygen are supplied, and are free from heat loss and thus have about twice the efficiency of internal combustion engines. In addition, since fuel cells directly convert chemical energy, generated by combination of hydrogen and oxygen, to electrical energy, they release almost no contaminants. Accordingly, fuel cells have other advantages of environmental friendliness and the ability to reduce concerns about depletion of resources in accordance with an increase in energy consumption.

Based on the type of electrolyte used, fuel cells are largely classified into polymer electrolyte membrane fuel cells (PEMFCs), phosphoric acid fuel cells (PAFCs), molten carbonate fuel cells (MCFCs), solid oxide fuel cells (SOFCs), alkaline fuel cells (AFCs) and the like. These various types of fuel cells essentially operate on the same principle, but are different in terms of the type of fuel used, operation temperature, catalyst, electrolyte and the like. Of these, polymer electrolyte fuel cells are known to be the most promising in the fields of transport systems as well as small-scale stationary electricity-generators, because they operate at lower temperatures and are capable of realizing miniaturization due to their higher power density, as compared to other fuel cells.

One of the most important factors in improving the performance of polymer electrolyte fuel cells is to maintain moisture content in the polymer electrolyte membrane of membrane electrode assembly by providing moisture in an amount not less than a predetermined level. This is the reason that polymer electrolyte membranes show a rapid decrease in electricity-generation efficiency, when dried.

Methods for humidifying polymer electrolyte membranes include 1) a bubbler humidification method that supplies moisture by filling a internal pressure vessel with water and passing a target gas through a diffuser, 2) a direct injection method that supplies moisture by calculating a moisture supply amount required for the reaction of fuel cells and directly supplying the amount of moisture through a solenoid valve to a gas flow pipe, 3) a humidifying-membrane method that supplies moisture to a gas flow layer using a polymeric separation membrane, and the like. Of these, the humidifying-membrane method, which humidifies a polymer electrolyte membrane by supplying water vapor to a gas provided to the polymeric electrolyte membrane using a membrane that selectively permeates water vapor contained in an exhaust gas, is highly advantageous in that a humidifier can be lightweight and miniaturized.

The selective permeation membrane used for the humidification membrane method is preferably a hollow fiber membrane which has a high index of permeation area per unit volume in case of module formation. That is, the use of a hollow fiber membrane for production of humidifiers has advantages in that fuel cells can be sufficiently humidified even with a small amount due to the possibility of high-integration of the hollow fiber membrane with a wide contact surface area, inexpensive materials are available, and moisture and heat contained in an unreacted hot gas discharged from fuel cells can be recovered and then recycled through the humidifier.

Meanwhile, fuel cells, in particular, fuel cells for transport systems, must have sufficient durability to operate for extended periods of time. Accordingly, hollow fiber membranes for humidifiers require moisture and heat resistance to avoid deterioration for a long time under conditions of high temperature and high humidity. In addition, hollow fiber membranes for humidifiers should have superior hydrophilicity to selectively permeate moisture contained in an exhaust gas. However, moisture and heat resistance and hydrophilicity are mutually exclusive properties which are incompatible with each other. Accordingly, hollow fiber membranes for humidifiers that satisfy the moisture and heat resistance have a disadvantage of unsatisfactory humidifying performance due to low hydrophilicity. In contrast, hollow fiber membranes for humidifiers that exhibit superior humidifying performance due to high hydrophilicity have low moisture and heat resistance, thus being disadvantageously unsuitable for the case where humidifiers should operate for a long period of time.

DISCLOSURE

Technical Problem

Therefore, the present invention relates to a hollow fiber membrane for humidifiers useful for fuel cells and a method for manufacturing the same, capable of actually solving one or more problems derived from the above restrictions and disadvantages associated with the prior arts.

It is one object of the present invention to provide a hollow fiber membrane for a humidifier with superior moisture and heat resistance and hydrophilicity, and a method for manufacturing the same.

It is another object of the present invention to provide a hollow fiber membrane for a humidifier that exhibits superior hydrophilicity and excellent crossover prevention properties and at the same time can be manufactured at low cost, and a method for manufacturing the same.

It is yet another object of the present invention to provide a humidifier for a fuel cell that exhibits superior hydrophilicity and excellent humidification properties and at the same time can be manufactured at low cost.

Other features and advantages of the present invention will be illustrated in the following description and be obviously from the description. Further features and advantages of the present invention will be understood from exemplary embodiments. The above and other objects and other advantages of the present invention will be realized and accomplished by the structure specified in the detailed description and claims as well as in the accompanying drawings.

Technical Solution

In accordance with one aspect of the present invention, the above and other objects can be accomplished by the provision of a hollow fiber membrane for a humidifier, comprising: a tube-type first hydrophilic polymer film having a hollow center; and a second hydrophilic polymer film coated on the inner surface of the tube-type first hydrophilic polymer film.

In accordance with another aspect of the present invention, provided is a method for manufacturing a hollow fiber membrane for a humidifier, comprising: producing an intermediate hollow fiber membrane from a first hydrophilic polymer material; potting the intermediate hollow fiber membrane in a housing to produce an intermediate hollow fiber membrane module; and coating a second hydrophilic polymer film on the inner surface of the intermediate hollow fiber membrane.

In accordance with yet another aspect of the present invention, provided is a humidifier for a fuel cell, comprising: a housing provided with a first inlet, through which a reaction gas to be supplied to a fuel cell enters, and a second inlet, through which a moisture-containing unreacted gas emitted from the fuel cell enters; a first hydrophilic polymer film and a second hydrophilic polymer film provided in the housing, the first and second hydrophilic polymer films providing a flow passage for the reaction gas entering through the first inlet and selectively permeating only moisture of the moisture-containing unreacted gas entering through the second inlet.

It should be understood that both the above general techniques and the following detailed description are given for the purpose of illustration or description of the present invention and are made for a more detailed explanation about the invention disclosed in the claims.

Advantageous Effects

According to the hollow fiber membrane for a humidifier and the method for the same of the present invention, provided are a hollow fiber membrane with superior properties including moisture and heat resistance, hydrophilicity and selective permeation for moisture, and a humidifier for a fuel cell with maximized durability and humidification performance.

In addition, according to the hollow fiber membrane for a humidifier and the method for the same of the present invention, provided can be a hollow fiber membrane for a humidifier that exhibits superior hydrophilicity and excellent crossover prevention properties and can be manufactured at low cost. As a result, a humidifier for a fuel cell with superior humidification properties can be also provided at low cost.

DESCRIPTION OF DRAWINGS

The above and other objects, features and other advantages of the present invention will be more clearly understood from the following detailed description taken in conjunction with the accompanying drawings, in which.

BEST MODE

Hereinafter, one embodiment of the present invention will be illustrated in detail with reference to the annexed drawings.

Figure 1:
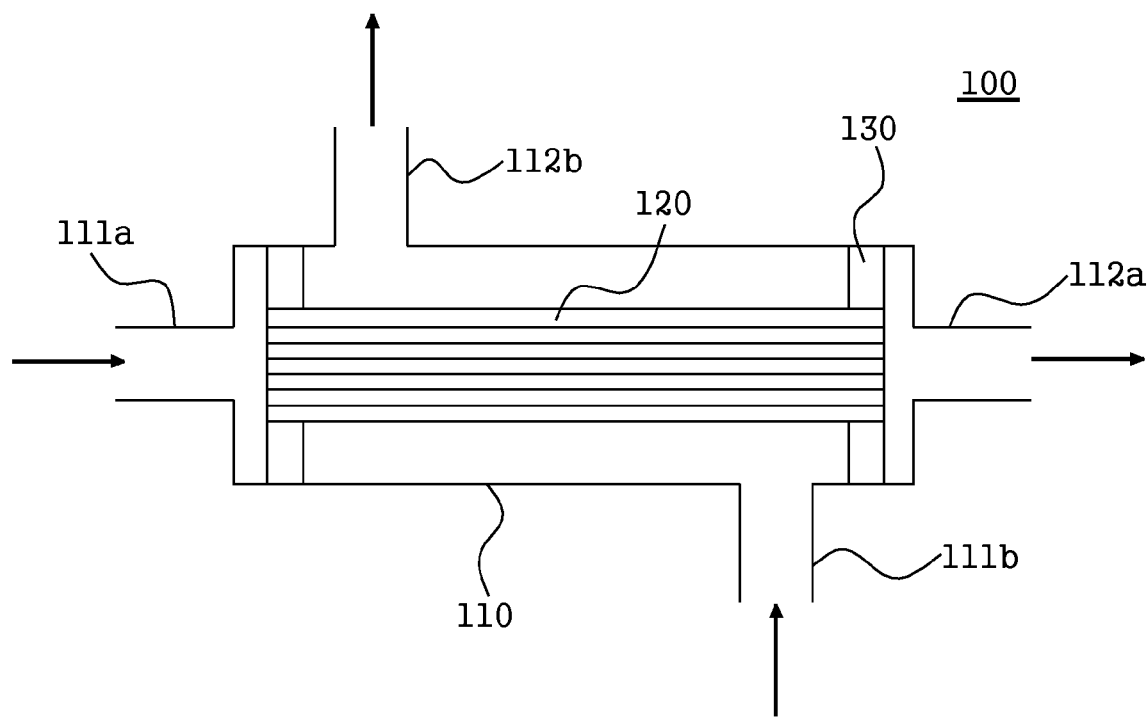
FIG. 1 is a schematic view illustrating a humidifier for a fuel cell according to one embodiment of the present invention.

FIG. 1 is a schematic view illustrating a humidifier for a fuel cell according to one embodiment of the present invention.

As shown in FIG. 1, a humidifier for a fuel cell 100 according to the one embodiment of the present invention comprises a housing 110 that houses a bundle of a plurality of hollow fiber membranes 120. A first inlet 111a, through which a reaction gas to be supplied to the fuel cell (not shown) enters, is located at one side of the housing 110, and a first outlet 112a, through which the reaction gas exits, is located at the other side of the housing 110.

Both ends of the bundle of the hollow fiber membrane 120 are fixed through an adhesive 130 at both sides of the housing 110, respectively. The adhesive 130 blocks flow of air between the center of the housing 110, and either of the first inlet 111a and the first outlet 112a. Meanwhile, because the each of the hollow fiber membranes 120 has open opposite ends, it has hollow 123 that is in gas communication with both the first inlet 111a and the first outlet 112a. Accordingly, the reaction gas entering through the first inlet 111a can move to the other side of the housing 110 provided with the first outlet 112a only through the hollow 123 of the hollow fiber membranes 120.

Meanwhile, a second inlet 111b, through which the moisture-containing unreacted gas emitted from the fuel cell enters, and a second outlet 112b though which the unreacted gas that enters the center of the housing 110 through the second inlet 111b is discharged, are located in the center of the housing 110.

The operation principle of the humidifier for a fuel cell according to the one embodiment of the present invention will be illustrated in detail.

The reaction gas supplied to the fuel cell enters through the first inlet 111a and at the same time, the moisture-containing unreacted gas discharged from the fuel cell enters the center of the housing 110 through the second inlet 111b. The reaction gas entering through the first inlet 111a moves through the hollows 123 of the bundle of the hollow fiber membrane 120 toward the first outlet 112a.

The reaction gas entering through the first inlet 111a is dry, whereas the unreacted gas entering the center of the housing 110 through the second inlet 111b contains a great amount of moisture, thus leading to a substantial difference in humidity between the interior and exterior of the hollow fiber membrane 120. This humidity difference causes the moisture contained in the unreacted gas to permeate through the hollow fiber membrane 120 into the corresponding hollow 123 thereby increasing the humidity of the reaction gas that moves toward the first outlet 112a along the hollow 123 of the hollow fiber membrane 120. Meanwhile, the unreacted gas from the fuel cell, entering the center of the housing 110 through the second inlet 111b, loses moisture and thus gradually becomes dry. The unreacted gas thus dried is discharged to the outside of the humidifier through the second outlet 112b. Consequently, the operation of the humidifier of the present invention as mentioned enables the reaction gas having a humidity higher than the original reaction gas that enters the humidifier 100 to be supplied to the fuel cell.

According to one embodiment of the present invention, it is preferable that the second inlet 111b be located adjacent to the first outlet 112a and that the second outlet 112b be located adjacent to the first inlet 111a. This serves to sufficiently permeate the moisture contained in the unreacted gas throughout the hollow 123 of the hollow fiber membrane 120 arranged in the housing 110. That is, the humidity of the reaction gas that moves from the first inlet 111a to the first outlet 112a is low at the side of the first inlet 111a, but becomes higher toward the first outlet 112*a* due to continuous supply of moisture from the unreacted gas through the hollow fiber membrane 120. Accordingly, a portion of the hollow fiber membrane 120 located at the side of the first inlet 111*a* comes into contact with the unreacted gas with a lower humidity, and a portion of the hollow fiber membrane 120 located at the side of the first outlet 112*a* comes into contact with the unreacted gas with a higher humidity, thus accomplishing uniform moisture permeation throughout the overall hollow fiber membrane 120.

Figure 2:
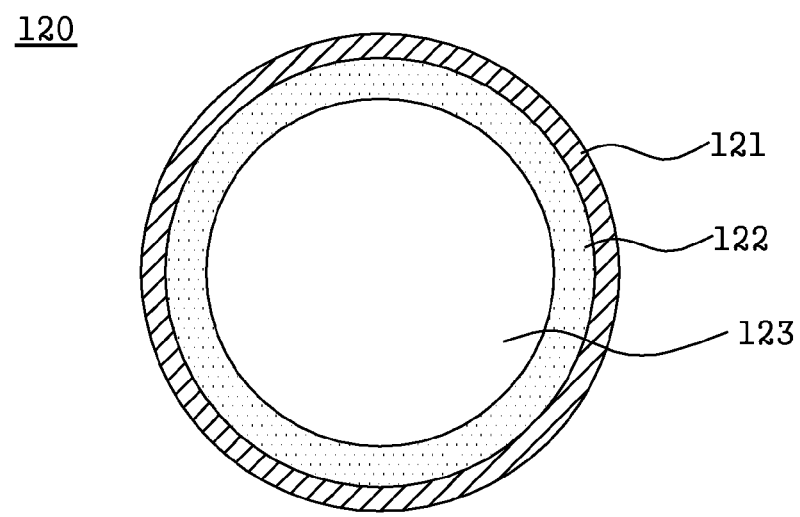
FIG. 2 is a cross-sectional view illustrating a hollow fiber membrane for a humidifier according to one embodiment of the present invention.

FIG. 2 is a cross-sectional view illustrating a hollow fiber membrane for a humidifier according to one embodiment of the present invention.

As shown in FIG. 2, the hollow fiber membrane for a humidifier 120 according to the one embodiment of the present invention comprises a tube-type first hydrophilic polymer film 121 having a hollow center, and a second hydrophilic polymer film 122 coated on the inner surface of the tube-type first hydrophilic polymer film 121.

Meanwhile, moisture and heat resistance and hydrophilicity are mutually exclusive properties which are incompatible with each other. For this reason, neither durability nor humidification performance of humidifiers can be satisfied only with one hydrophilic polymer. That is, disadvantageously, the polymer film satisfying moisture and heat resistance cannot exhibit satisfactory humidifying performance due to its relatively low hydrophilicity, and conversely, the polymer film exhibiting superior humidifying performance due to high hydrophilicity is unsuitable for the case where the humidifier should operate for a long period of time due to its low moisture and heat resistance. Accordingly, it is preferable that the first and second hydrophilic polymer films 121 and 122 be composed of materials that differ in moisture and heat resistance and hydrophilicity.

As to the hollow fiber membrane for a humidifier in accordance with the one embodiment of the present invention, the moisture and heat resistance of the tube-type first hydrophilic polymer film 121 is superior to that of the second hydrophilic polymer film 122 coated on the inner surface of the first hydrophilic polymer film 121. On the other hand, the hydrophilicity and selective moisture permation (or crossover prevention property) of the second hydrophilic polymer film 122 are superior to those of the first hydrophilic polymer film 121. This is the reason that although the hydrophilicity and selective permeation of the overall hollow fiber membrane do not greatly depend on the place (i.e., one of the inner and outer surfaces of the hollow fiber membrane) where the polymer film exhibiting relatively superior hydrophilicity and selective permeation throughout the hollow fiber membrane is located, the case wherein the polymer film having relatively superior moisture and heat resistance is located on the outer surface of the hollow fiber membrane is more preferable, so as to improve moisture and heat resistance of the overall hollow fiber membrane.

The first hydrophilic polymer film 121 according to the one embodiment of the present invention is made of polyetherimide (PEI), and the second hydrophilic polymer film 123 is made of a perfluorinated sulfonic acid copolymer (e.g., NAFION™ available from Dupont, corp.). It should be understood that the hydrophilic polymer film according to the present invention is not limited thereto and any hydrophilic polymer film is encompassed within the scope of the present invention. For example, the first hydrophilic polymer film 121 may be produced from polyetherimide (PEI), polyimide (PI), polyamideimide (PAI), polysulfone or polyethersulfone, and the second hydrophilic polymer film 122 may be produced from a perfluorinated sulfonic acid copolymer, polyvinylalcohol (PVA) or polyacrylonitrile (PAN).

Meanwhile, the perfluorinated sulfonic acid copolymer used for production of the second hydrophilic polymer film 122 is preferred as hollow fiber membranes for humidifiers due to its very high hydrophilicity and crossover prevention properties, but has disadvantages of expensiveness due to the difficulty in preparing the same. Accordingly, the hollow fiber membrane according to one embodiment of the present invention uses polyetherimide as a material for the tube-type first hydrophilic polymer film 121 and a small amount of perfluorinated sulfonic acid copolymer as a material for the second hydrophilic polymer film 122 coated on the inner surface of the tube-type first hydrophilic polymer film 121, thus advantageously reducing overall production cost.

Figure 3:
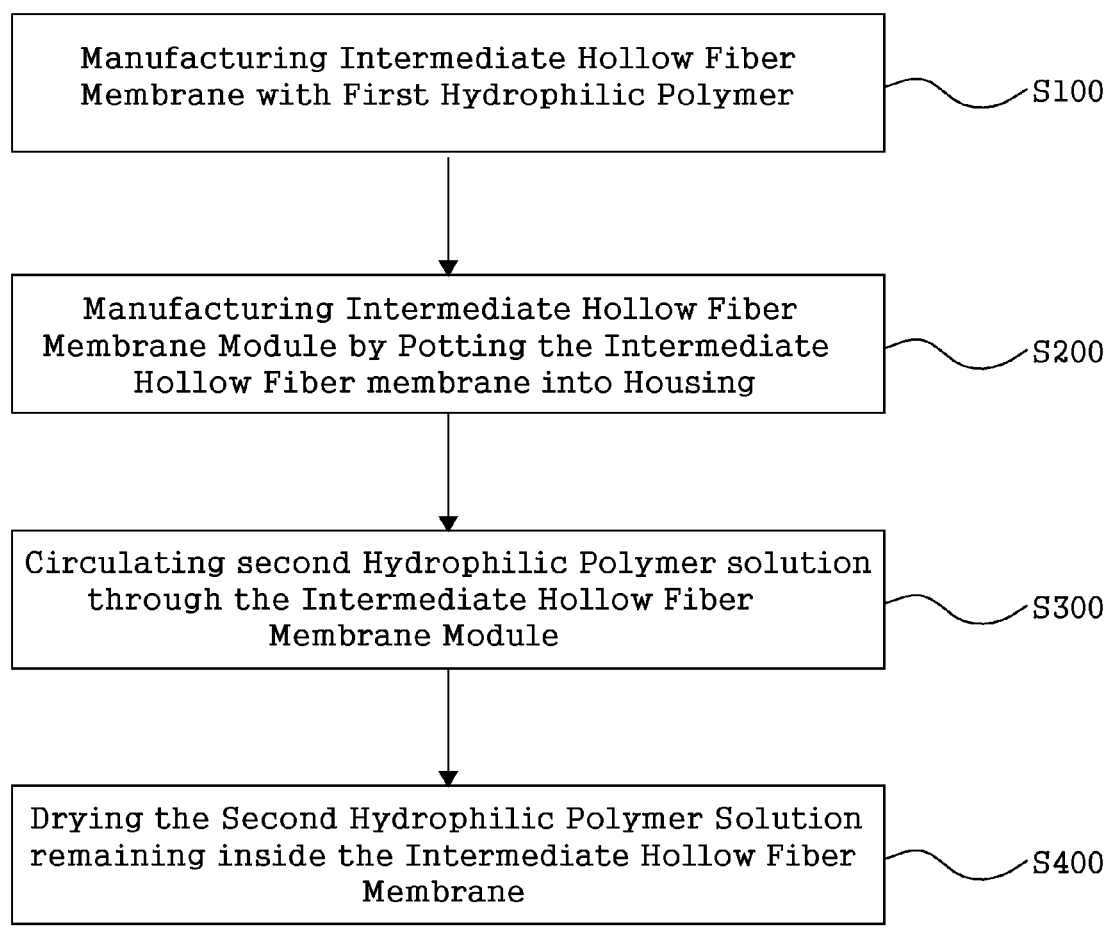
FIG. 3 is a flow chart illustrating a method for manufacturing a hollow fiber membrane for a humidifier according to the one embodiment of the present invention.

FIG. 3 is a flow chart illustrating a method for manufacturing a hollow fiber membrane for a humidifier according to the one embodiment of the present invention.

First, an intermediate hollow fiber membrane is produced from a first hydrophilic polymer material (S100). The production of the intermediate hollow fiber membrane is carried out using any conventional method for manufacturing hollow fiber membranes. For example, the intermediate hollow fiber membrane is manufactured by preparing an inside coagulation solution that comprises: a spinning dope consisting of a hydrophilic polymer (such as polyetherimide), an organic solvent and an additive; and a solution consisting of a glycol compound or an organic solvent and water, discharging the inside coagulation solution to the air through a double tube nozzle, immersing the same in a coagulation bath containing an outside coagulation solution, and solidifying the same, followed by washing, drying and rolling.

Subsequently, step 100 is repeated several times to obtain a bundle of intermediate hollow fiber membranes and the bundle is potted in a housing to produce an intermediate hollow fiber membrane module (S200).

A second hydrophilic polymer solution is circulated using a pump through the intermediate hollow fiber membrane thus obtained (S300). After the second hydrophilic polymer solution flows throughout the hollow of the intermediate hollow fiber membrane, it ceases the circulation. Subsequently, the second hydrophilic polymer solution that remains on the inner surface of the intermediate hollow fiber membrane is dried to form a second hydrophilic polymer film 122 on the inner surface of the tube type first hydrophilic polymer film (121) (S400).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A humidifier for a fuel cell, comprising:
    a housing provided with a first inlet, through which a reaction gas to be supplied to a fuel cell enters, and a second inlet, through which a moisture-containing unreacted gas emitted from the fuel cell enters; and
    a hollow fiber membrane comprising a first hydrophilic polymer film and a second hydrophilic polymer film, the hollow fiber membrane providing a flow passage for the reaction gas entering through the first inlet,
    wherein only moisture of the moisture-containing unreacted gas permeates into the flow passage through the hollow fiber membrane such that the reaction gas is humidified, wherein the first hydrophilic polymer film is on an outer surface of the second hydrophilic polymer film, wherein the second hydrophilic polymer film is made of a perfluorinated sulfonic acid copolymer, and wherein the first hydrophilic polymer film has higher moisture and heat resistance but lower hydrophilicity than the second hydrophilic polymer film.

2. The humidifier according to claim 1, wherein the housing is further provided with:

a first outlet in gas communication with the flow passage, through the first outlet the humidified reaction gas being supplied to the fuel cell; and a second outlet, through the second outlet the unreacted gas dried by the permeation of the moisture into the flow passage being discharged.

3. The humidifier according to claim 2, wherein the second inlet is located adjacent to the first outlet and the second outlet is located adjacent to the first inlet.

4. The humidifier according to claim 1, wherein the first hydrophilic polymer film is made of polyetherimide.

* * * * *